Dec. 18, 1962 HISASHI KANEKO 3,069,504

MULTIPLEX PULSE CODE MODULATION SYSTEM

Filed Oct. 11, 1960 3 Sheets-Sheet 1

Inventor
H. KANEKO
By [signature]
Attorney

Dec. 18, 1962 HISASHI KANEKO 3,069,504

MULTIPLEX PULSE CODE MODULATION SYSTEM

Filed Oct. 11, 1960 3 Sheets-Sheet 2

Inventor
H. KANEKO
By [signature]
Attorney

Dec. 18, 1962 HISASHI KANEKO 3,069,504

MULTIPLEX PULSE CODE MODULATION SYSTEM

Filed Oct. 11, 1960

3 Sheets-Sheet 3

Inventor

H. KANEKO

By [signature]

Attorney 3,069,504

MULTIPLEX PULSE CODE MODULATION SYSTEM

Hisashi Kaneko, Tokyo, Japan, assignor to Nippon Electric Company, Limited, Tokyo, Japan, a corporation of Japan Filed Oct. 11, 1960, Ser. No. 61,933
Claims priority, application Japan Oct. 19, 1959
3 Claims. (Cl. 179—15)

This invention relates to time-division multiplex pulse code modulation systems and in particular to an improved method of synchronizing in such systems.

The present invention is an improvement in the invention disclosed and claimed in a continuation-in-part application, Serial No. 50,628, filed Aug. 19, 1960, of my original application Serial No. 842,897, filed Sept. 28, 1959, now abandoned.

The main object of the present invention is to provide an improved synchronizing circuit arrangement for the time-division multiplexing pulse modulation system referred to above which, in the event of a collapse in synchronization of the system, considerably reduces synchronizing recovery time.

The above-mentioned and other features and objects of this invention and the manner of attaining them will become more apparent and the invention itself will be best understood by reference to the following description of an embodiment of the invention taken in conjunction with the accompanying drawings, in which:

FIGS. 1(*a*) and 1(*b*) illustrate two code pulse waveforms showing the manner in which synchronizing pulses may be combined with the channel pulses to produce a pulse train. FIG. 1(*a*) illustrates an interlace waveform, and FIG. 1(*b*) a sequence waveform.

It is known that excellent transmission quality can be secured when a voice or other signal is transformed into a pulse code modulation (hereinafter abbreviated PCM) signal by quantizing, sampling, and encoding. Since PCM uses the principle of sampling, time-division multiplexing is possible in the same manner as in other pulse modulation systems. In a time-division multiplex system according to the prior art one channel is used for synchronizing pulses in order to synchronize the transmitting end with the receiving end.

In the invention disclosed in my above-mentioned continuation-in-part application binary code digit pulses are used as the synchronizing pulses in the same manner as are the binary code digit pulses used for the signaling channels.

Now let it be assumed that $q$-synchronizing pulses are contained in an $m$-digit, $n$-channel multiplex pulse sequence. In my invention referred to above, synchronizing equipment is provided with a function such that the transmitted pulse sequence (which contains the synchronizing pulses); and a synchronizing pulse code sequence generated at a receiving station (which has been agreed upon between the transmitting and the receiving terminal stations) are compared against each other at a time at which the synchronizing pulses in the received wave should occur and, if the two sequences are not in coincidence, their relative time position is shifted bit by bit. This operation of comparison is repeated until normal synchronization is recovered.

Figure 1:
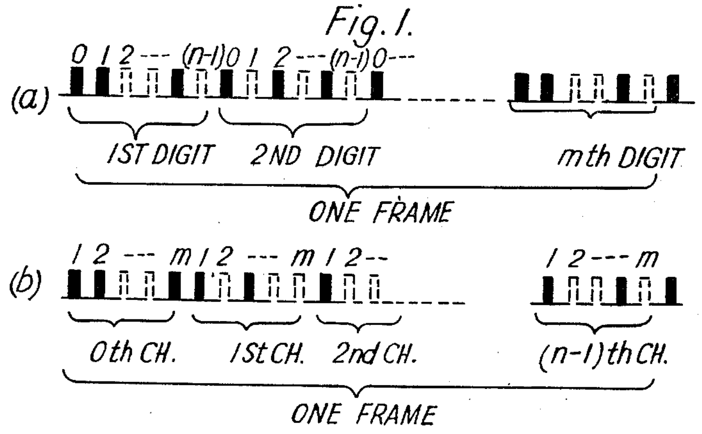

There are a number of methods by which the synchronizing pulses may be arranged in the entire pulse sequence. Of these methods, the following two methods are frequently adopted: One method is called the interlace system. According to this method, the synchronizing pulses are uniformly distributed in one frame of pulse code sequences compared of $m \cdot n$ pulses. Another method is called the sequence system in which the synchronizing pulses are transmitted sequentially at the beginning of a frame. The pulse waveforms of these two systems are respectively shown in FIGS. 1(*a*) and (*b*), the synchronizing recovery time in the event of a collapse of synchronization differing between the two systems.

Synchronizing equipment according to the present invention relates to the construction of equipment for improving the operation of the above-mentioned sequence system.

Figure 2:
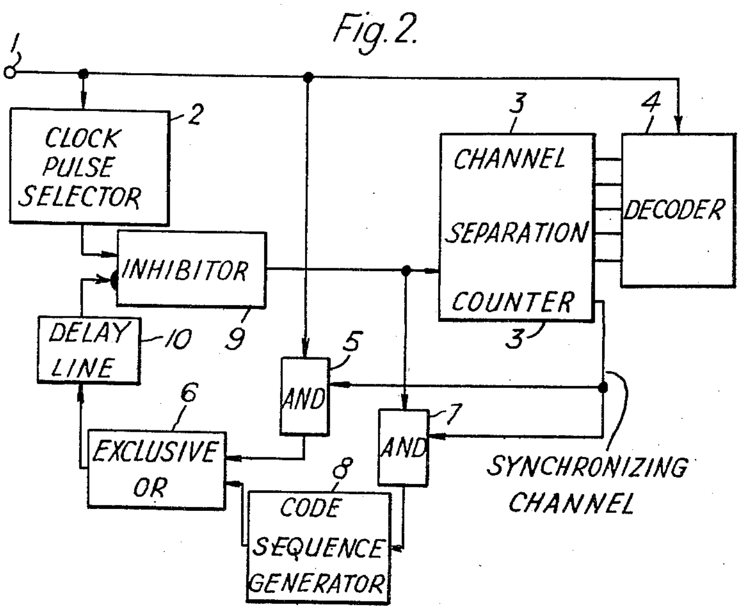
FIG. 2 is a schematic block diagram of a receiving terminal station illustrating one known type of synchronizing system.

As above stated, FIG. 2 shows a schematic block diagram of the receiving terminal station according to a known sequence system, the equipment having the function of shifting clock pulses bit by bit upon the discovery of a non-synchronous condition so as to recover synchronization. A transmitted pulse code sequence applied to terminal 1 is applied to decoder 4. At the same time, clock pulses having the same frequency as the fundamental repetition frequency component of the received wave are generated by the clock pulse selector 2 to cause the channel separation counter 3 to operate through the inhibitor 9. The decoder 4 decodes the coded pulses of the various channels through the combined action of the channel separating gating pulses applied thereto from the channel separation counter 3 and the received input pulses from terminal 1.

The synchronizing channel separation pulses, which is one of the outputs of the channel separation counter 3, are applied to the AND gates 5 and 7. The AND gate 5 selects a pulse sequence from transmitted code pulse sequences while the AND gate 7 selects the number of clock pulses occurring in the synchronizing channel pulse time interval from clock pulses which have passed through the inhibitor 9 to cause the synchronizing code sequence generator 8 to operate. The synchronizing code sequence generator 8 which comprises a sequence or ring counter and OR circuit as described in my copending continuation-in-part application is for producing a predetermined synchronizing pulse code sequence which has been agreed upon for the transmitting and receiving terminals of the channel. The generator is under the control of the output pulses from the AND gate 7. The sequence generator has a circuit construction which will maintain the same position in the code pattern as that produced at the preceding sampling time during which trigger pulses have not been received from the AND gate 7 during the synchronizing channel selecting time interval. Circuit 6 is the so-called "Exclusive OR circuit" which develops no output when the input pulses from the AND gate 5 and the input pulses from the synchronizing code sequence generator 8 coincide with each other, while providing output pulses only when said input pulses are not in coincidence. In other words, a synchronizing pulse code sequence produced at the receiver can be compared with the code sequence at a synchronizing code time in an interval of the transmitted code pulse sequence. An output by the Exclusive OR circuit inhibits clock pulses via the delay circuit 10 and the inhibitor 9, retarding the stepping on of the channel separator circuit. Strictly speaking, a delay time interval is equal to one clock pulse interval plus the delay in the intermediate circuits.

If the system is operating under normal synchronizing conditions, a synchronizing code sequence produced by generator 8 coincides with a synchronizing code sequence selected from the received pulses by the AND gate 5 with the result that no output pulse appears in the circuit 6, the entire system maintaining normal operation. If synchronism collapses for some reason or other, another channel code sequence will be selected by AND gate 5. Because, in general, the channel pulses are encoded by voice signals, etc. and the pulses occur according to the probabilistic nature of input signals, the synchronizing code sequence produced from generator 8 does not normally coincide with the erroneously selected channel pulse sequence, the non-coincidence meaning the discovery of a non-synchronous condition and the production of an error pulse at the exclusive OR circuit. As a result, the stepping of the channel separation circuit consisting of the ring counter, etc. is retarded by one bit for the discovery of each non-synchronous condition. When any clock pulse is inhibited, the synchronizing pulse sequence generator 8 initiates the same code as that produced at the time of the previous pulse and this code is compared with the pulses selected by the gate 5. If they coincide with each other, a non-synchronous condition cannot be discovered until a comparison is made with the succeeding synchronizing code (since according to the laws of probability it may be a voice or channel signal code); whereas non-coincidence means the discovery of a non-synchronous condition and the above-mentioned operation is repeated until coincidence is attained.

Since it has been assumed that there exist successive $q$-synchronizing pulses in one frame there was a necessity with the known equipment as shown in FIG. 2 that, if a non-synchronous condition cannot be found at the $q$th synchronizing pulse by repeating the above-mentioned operation, it had to be found in a synchronizing pulse sequence of the following frame which occurs later by $(m \cdot n - q + 1)$ bits. Therefore, the non-synchronous state shifts towards the synchronous state by shifting one pulse interval $\tau p$ during a synchronizing pulse interval consisting of $q$-synchronizing pulses and, in addition, once for each $q$ failures in the finding of non-synchronous conditions, thereby, requiring a transition time of $(m \cdot n - q + 1)\tau p$. The result is that the expectation of the sychronizing recovery time is not much different from that of the interlace system as has been previously mentioned.

Figure 4:
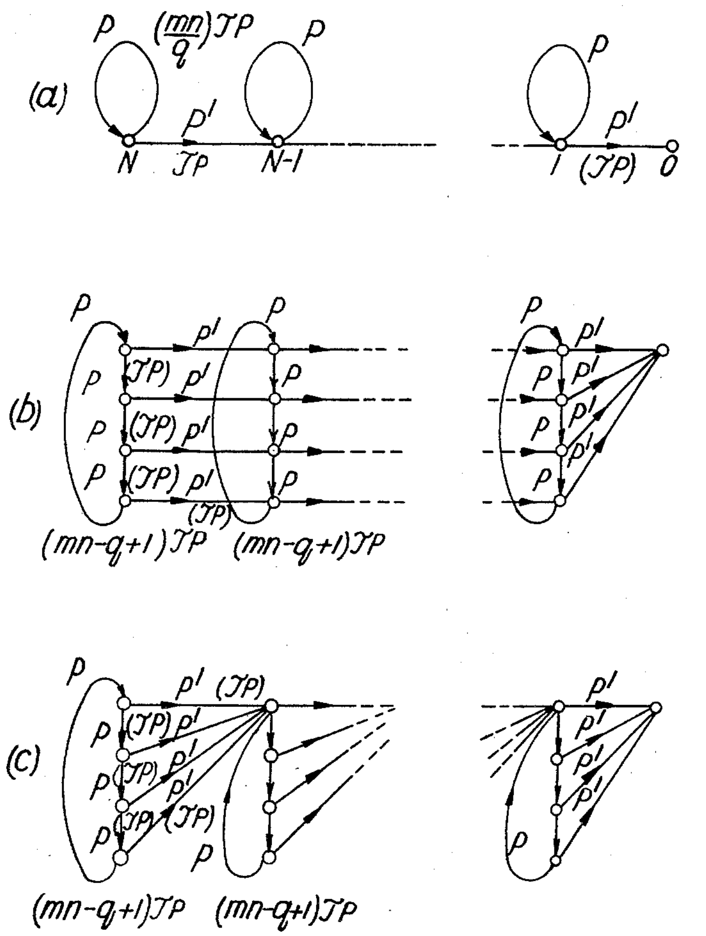

The above-mentioned phenomena will now be explained referring to the Shannon diagrams. FIG 4($a$) illustrates the case of the interlace system. Let the synchronizing state be denoted by 0 and the collapse of synchronization be produced at the $n$th state following said synchronizing state. Then this state can be expressed by N. Let the probability of finding a non-synchronous condition be expressed by $p'$ and that of the incapability of finding a non-synchronous condition due to the coincidence of the channel code and the synchronizing code by some channel be expressed by $p$. Then we have the relationship $p + p' = 1$. The recovery process takes the form of Markov's process. The transition time interval for remaining in the same state is expressed by $$\left(\frac{m \cdot n}{q}\right)\tau p$$

while the time interval required for the transition to the subsequent state is expressed by $\tau p$. The expectation of the entire recovery time becomes $$E(t) = \left(\frac{m \cdot n}{q} + 1\right) N \cdot \tau p$$

assuming that $p = p' = \frac{1}{2}$. The above-mentioned ordinary sequence system is indicated at ($b$) in FIG. 4. As is illustrated, for synchronizing recovery, N states out of $N \cdot q$ states must be passed through along the directional paths, only the directional paths returning to the first synchronizing pulse from the $q$th synchronizing pulse requiring a transition time of $(mn - q + 1)\tau p$, whereas the transition time of any other directional path is $\tau p$. With this system, the $i$th group state receives constraint by the $(i+1)$th group state.

Where a non-synchronous condition is discovered at the $j$th synchronizing pulse time in the $(i+1)$th group, the comparison should be started from the $j$th synchronizing pulse in the $i$th group. Therefore as soon as the total number of failures to obtain synchronism reaches $q$, the transition is made to the state of $i = 1$ requiring a time interval of $(m \cdot n - q + 1)\tau p$. Since the transition takes place once for every $q$ times of failure to obtain a synchronous condition, the entire synchronizing recovery time becomes comparatively long.

Such defects as mentioned previously and were inherent in the known equipment have been eliminated by the present invention.

According to the present invention, not only is the channel separation counter reset each time a collapse of synchronization occurs, but also the synchronizing pulse sequence generator in the receiver is reset to the zero position, thereby making the synchronizing recovery time small as compared with the known equipment. Further, by performing the above-mentioned resetting operations, the circuit construction is simplified.

Figure 3:
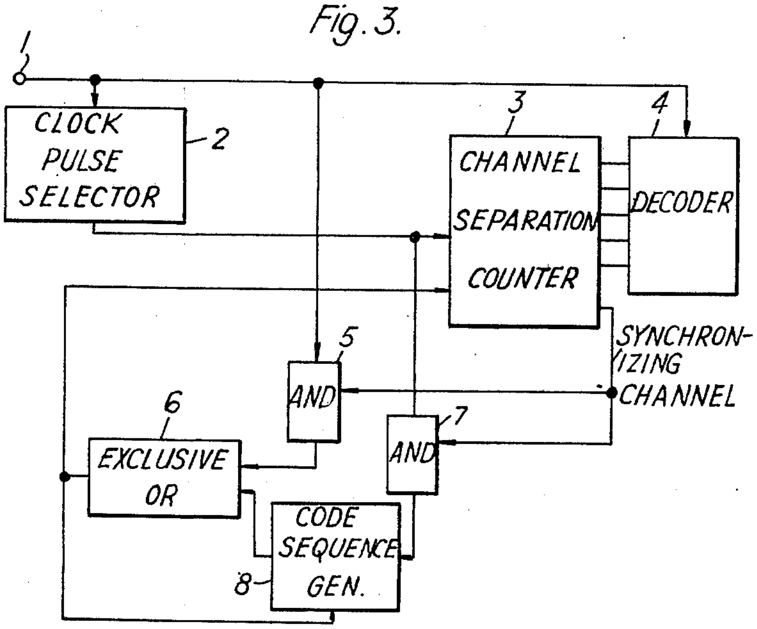
FIG. 3 is a schematic block diagram of a receiving terminal station illustrating the synchronizing system of the present invention.

FIG. 3 shows a schematic block diagram of equipment illustrating the present invention. Both the construction and operation of each circuit element of the equipment may be the same as corresponding elements shown in FIG. 2. The output of the AND gate 5 is compared with the output of the synchronizing code generator 8 by the Exclusive OR circuit 6. If the two outputs are in time coincident, there is no output from the Exclusive OR circuit 6, while in case of non-coincidence, an output pulse is developed. The output pulse is applied to the channel separation circuit 3 to cause the channel separation counter to reset to the zero pulse position of the synchronizing code sequence and, at the same time, the output pulse is also applied to the synchronizing code generator 8 to reset the latter to its zero pulse position. When the system is in synchronism, no output appears in the Exclusive OR circuit, whereas, with a collapse of synchronization for one reason or another, the outputs of the AND gate 5 and of the synchronizing code generator 8 show non-coincidence, an output pulse appears in the Exclusive OR circuit 6 and both channel separator counter 3 and code generator 8 are reset. Thereupon, the comparison is resumed from the first pulse in a synchronizing code group comprising $q$ synchronizing pulses, resulting in the resetting of channel separator counter 3 and of code generator 8 each time a non-synchronous condition is found, until the entire system is restored to synchronism by the successive repetition of the operation. The manner in which these operations takes place is illustrated in FIG. 4($c$).

Suppose that the collapse of synchronization occurs at the Nth state. Then there are N groups of asynchronous states, each group consisting of $q$ states, and one synchronous state in the $q \cdot N$ states. If a non-synchronous condition cannot be found by any chance when a synchronizing code sequence is not in coincidence with a pulse sequence selected by the AND gate 5, the downwardly directed paths in the same group are followed. If a non-synchronous condition cannot be found at the $q$th synchronizing pulse, the comparison is resumed after returning to the state of $q=1$ after a transition time interval of $(m \cdot n=q+1)\tau p$.

If a non-synchronous condition is found, the channel separation circuit counter 3 and the synchronizing code generator 8 are reset each time the intergroup transition of N groups is performed, differing from the case of (*b*) of the same figure, with the result that the comparison is invariably started from the first pulse of $q$ pulses and the initial state of each group has nothing to do with the position at which a non-synchronous condition is found in the previous group.

Since the probability of finding a non-synchronous condition is $p'$ while the failure of such a finding is $p$, the probability of following the directional path having a long transit time which begins with the $q$th pulse position and ends with the first pulse in each group becomes $p^q$. This probability becomes extremely small where $p$ is small and $q$ is large. Accordingly, the probable duration of the entire synchronizing recovery time becomes much smaller than that obtained from the equipment based on the ordinary sequence system as shown in FIG. 2 or in FIG. 4(*b*).

Figure 5:
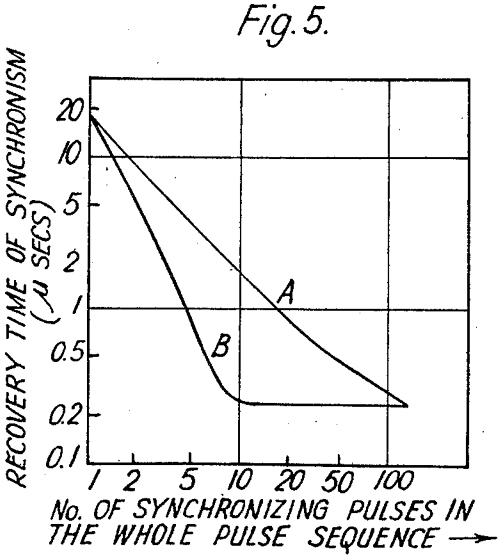
FIGS. 4 and 5 show various diagrams for illustrating the principle of the invention.

The recovery time of the ordinary sequence system is approximately that of the interlace system. The recovery time characteristics of the interlace system will now be compared with that of the synchronizing equipment of the present invention, referring to an example. FIG. 5 shows a result of comparison.

It is true, of course, that, where $q=1$, the same result is obtained no matter which system is adopted. For $q>1$, the recovery time in the interlace synchronizing system (A in FIG. 5) is approximately inversely proportional to $q$, whereas the recovery time of the equipment according to the present invention (B in said figure) becomes exceedingly short with an increase in the number of $q$—one-tenth of the time interval being sufficient for the case of $q=8$.

As has been fully described above, the synchronizing equipment according to the present invention is one having a short probable duration of recovery time. The equipment is stab'e and also has excellent characteristics due to the use of logical circuits of simple construction, e.g., by adopting a circuit construction capable of resetting a synchronizing code sequence each time a non-synchronous condition occurs due to a collapse of synchronism in a time-division multiplex PCM system. The present equipment can find use not only in PCM as applied to voice multiplex telephone channels, but also in television, telemetering, telecontrol, or in high-speed data transmission such as electronic exchange equipment. With the present equipment, it is also possible to provide more simple circuit constructions by investigating the statistical properties of information signals and to select a synchronizing code sequence having the lowest error occurrence probability for a multiplex signal sequence by providing known logical transformations for the above-mentioned logical circuits. Therefore, the present equipment has a wide field of application.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A synchronizing circuit arrangement for a time-division multiplex system employing pulse code modulation and including a plurality of signaling channels and a synchronizing channel, said channels having a predetermined repetition frequency;

characterized in that each pulse code bit of the synchronizing channel has the same characteristics as do the pulse code bits representing the quantized amplitude levels of the signals of said signaling channels and that there are provided: an input terminal for receiving the signaling code pulses and the synchronizing code pulses;

a channel separator comprising a sequence counter and having a plurality of signal channel outputs and a synchronizing channel output for providing gating pulses;

means for generating a train of clock pulses coincident with, and having a recurrent frequency equal to the fundamental repetition frequency component of the received wave;

means for triggering said channel separator with said clock pulses;

a first logic circuit responsive to a time coincident comparison of synchronizing channel gating pulses with said received code pulses to produce the pulses of said received code;

a second logic circuit responsive to a time coincident comparison of said synchronizing channel gating pulses with said clock pulses to produce output digit pulses;

means responsive to output pulses from said second logic circuit for locally generating the synchronizing pulse code sequence;

a third logic circuit responsive to a non-coincidence output of said local generating means and the said first logic circuit to produce a control pulse when said multiplex system becomes non-synchronous;

and means responsive to a control pulse for resetting said locally generating means and said channel separator sequence counter to the zero pulse position of the synchronizing code sequence.

2. A synchronizing circuit arrangement for a time-division multiplex system employing pulse code modulation and including a plurality of signalling channels and a synchronizing channel, said channels having a predetermined repetition frequency, each pulse code bit of the synchronizing channel having the same characteristics as the pulse code bits representing the signals in said signalling channels; comprising: an input terminal for receiving both the signalling code pulses of the signalling channels and the synchronizing code pulses; a channel separator, having a plurality of signal channel outputs and a synchronizing channel output; means connected to said input for generating a train of clock pulses coincident with, and having a recurrent frequency equal to, the fundamental repetition frequency component of the received wave; means for triggering said channel separator with said clock pulses; a first AND circuit connected to said input terminal and said synchronizing channel output of said channel separator for gating the received code pulses with the synchronizing channel output; a second AND circuit connected to said clock pulse generating means and said synchronizing channel output of said channel separator for gating the clock pulses with the synchronizing channel output; means responsive to pulses from said second AND circuit for locally generating the synchronizing pulse code sequence; a logic circuit coupled to said local generating means and said first AND circuit and responsive to a non-coincidence therebetween for producing an error indication; and means responsive to said error indication for resetting said local generating means and said channel separator to the zero pulse position of the synchronizing code sequence.

3. A synchronizing circuit arrangement for a time-division multiplex system employing pulse code modulation and including a plurality of signalling channels and a synchronizing channel, said channels having a predetermined repetition frequency, each pulse code bit of the synchronizing channel having the same characteristics as the pulse code bits representing the signals in said signalling channels; comprising: an input terminal for receiving both the signalling code pulses of the signalling channels and the synchronizing code pulses; a channel separator, having a plurality of signal channel outputs and a synchronizing channel output; means connected to said input for generating a train of clock pulses coincident with, and having a recurrent frequency equal to, the fundamental repetition frequency component of the received wave; means for triggering said channel separator with said clock pulses; means coupled to and gated by the said synchronizing channel output of said channel separator for locally generating the synchronizing pulse code sequence; means coupled to the input terminal and connected to the local generating means for comparing the locally generated pulse code sequence and the received pulse code and producing an error indication in the absence of coincidence; and means responsive to an error indication for resetting said local generating means and said channel separator to the zero pulse position of the synchronizing code sequence.

References Cited in the file of this patent

UNITED STATES PATENTS

| | | |
|---|---|---|
| 2,780,672 | Greefkes | Feb. 5, 1957 |
| 2,949,503 | Andrews et al. | Aug. 16, 1960 |